Figure 1:
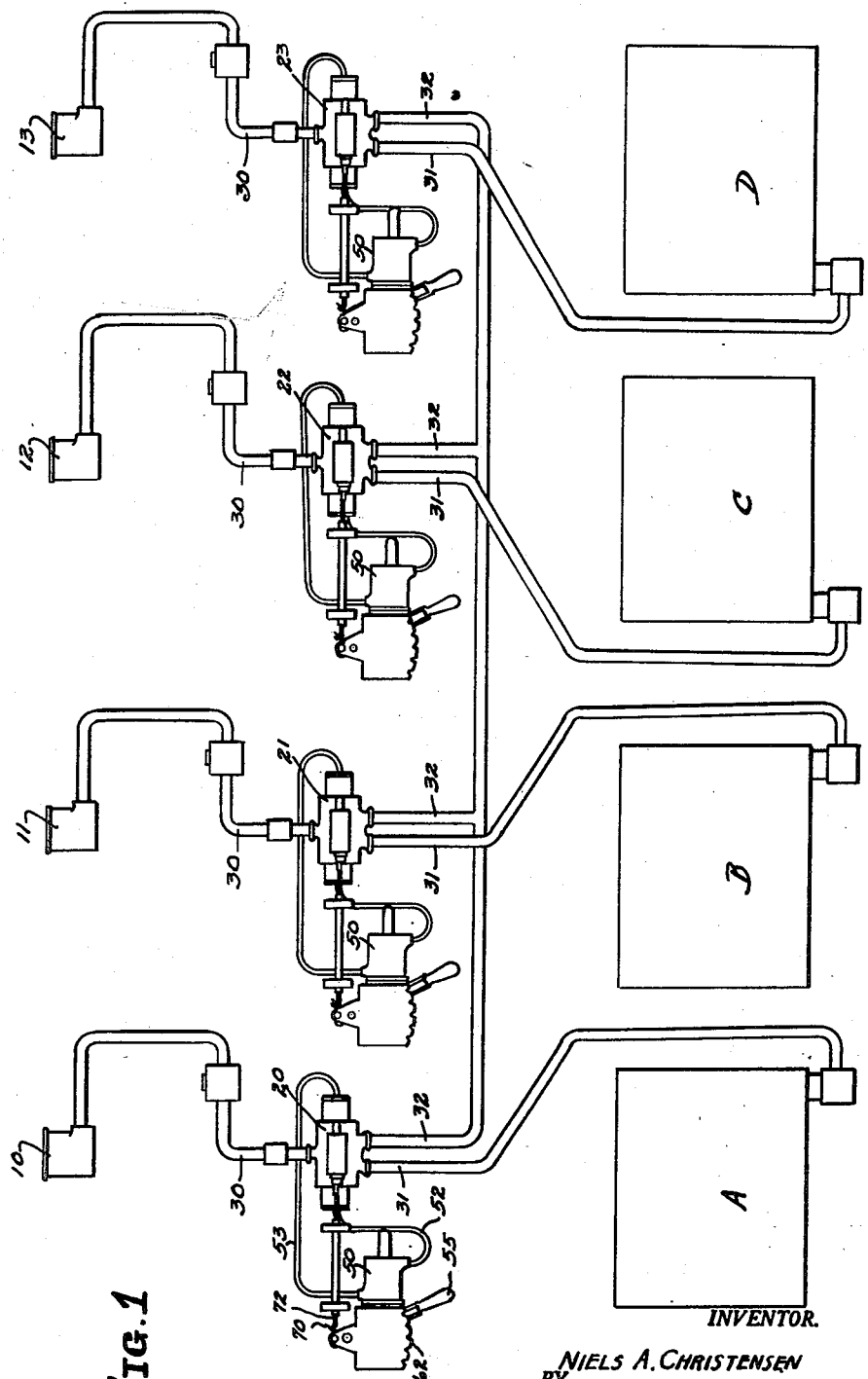

March 28, 1950     N. A. CHRISTENSEN     2,501,661
APPARATUS AND SYSTEM FOR FLUID CONTROL
Filed July 14, 1943     3 Sheets-Sheet 1

INVENTOR.
NIELS A. CHRISTENSEN
BY
ATTORNEYS

March 28, 1950 N. A. CHRISTENSEN 2,501,661
APPARATUS AND SYSTEM FOR FLUID CONTROL
Filed July 14, 1943 3 Sheets-Sheet 2
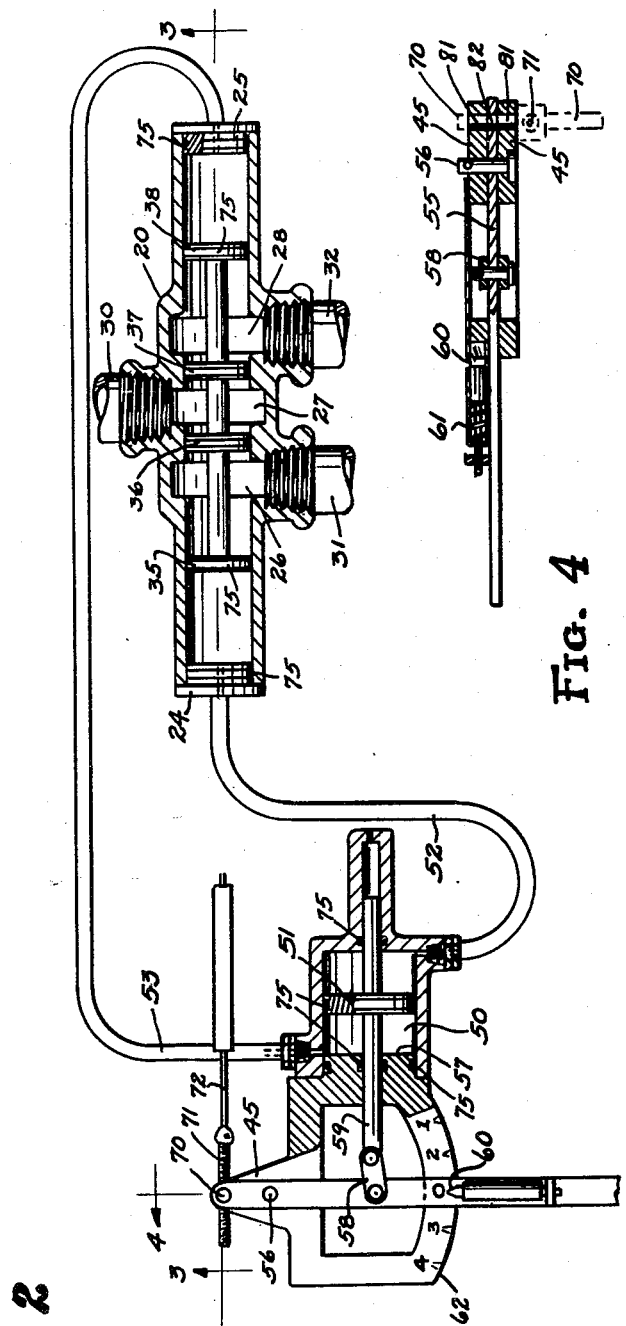
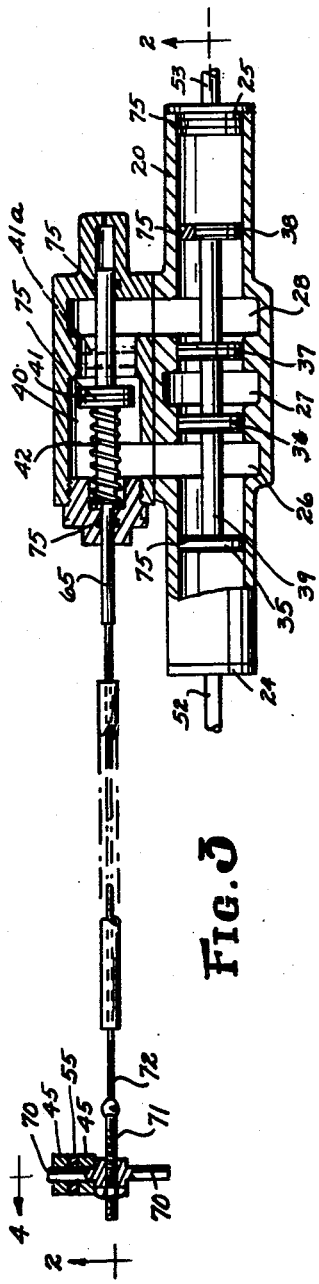
INVENTOR.
NIELS A. CHRISTENSEN
BY Bates, Teare, & McBean
ATTORNEYS

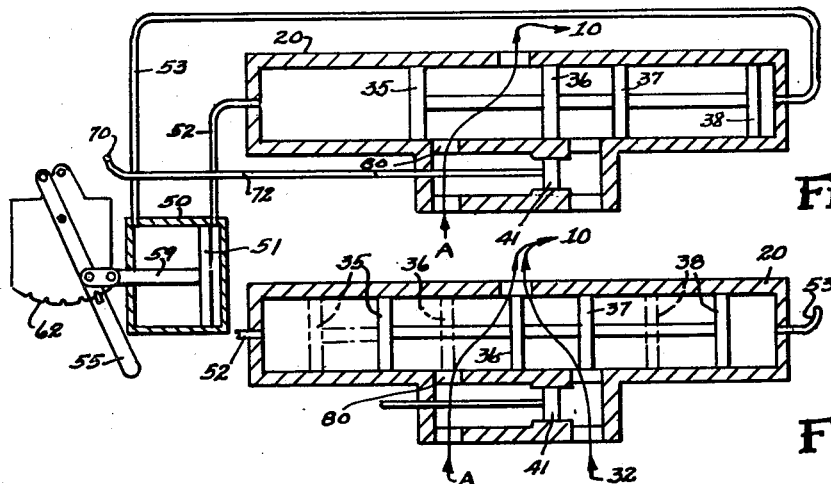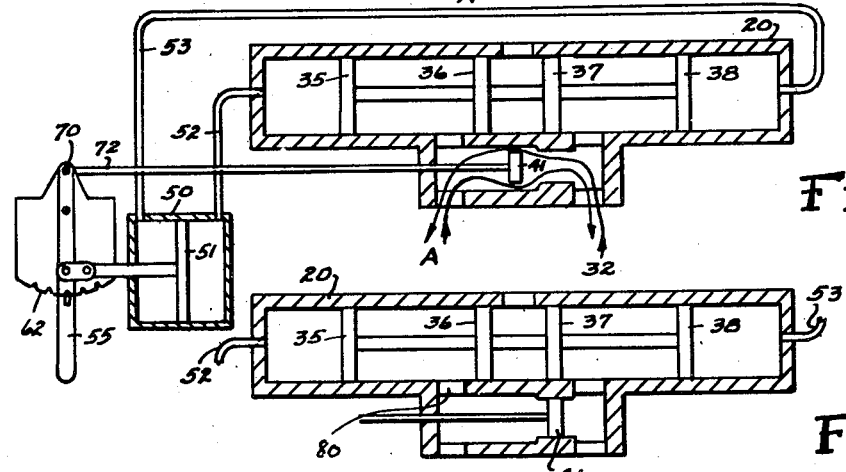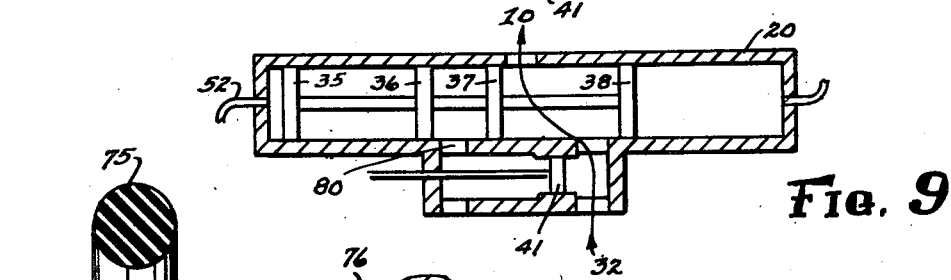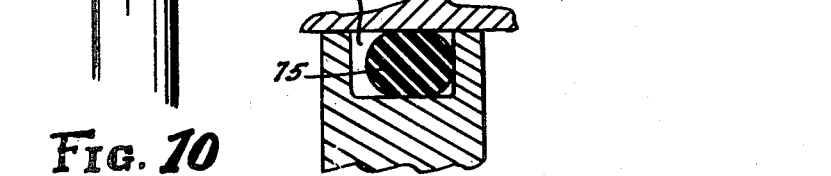

Patented Mar. 28, 1950

2,501,661

UNITED STATES PATENT OFFICE 2,501,661

APPARATUS AND SYSTEM FOR FLUID CONTROL

Niels A. Christensen, South Euclid, Ohio

Application July 14, 1943, Serial No. 494,749

6 Claims. (Cl. 137—78)

This invention pertains to a system and apparatus for selectively controlling the flow of liquid from a plurality of sources into one or a plurality of devices that normally use liquid in the operation thereof, such for example, as an airplane.

In modern airplane design, it is customary to use a plurality of tanks for one or more motors and to draw fuel from the tanks progressively as it is consumed on an extensive flight. In combat work, however, where the liability is present of sudden damage to one or more engines, or to one or more fuel supply tanks, there is great need for a system by means of which fuel may be supplied by any individual or combination of tanks and delivered to any individual or combination of engines. At the present time the fuel tanks are usually located at a point quite remote from the operator and the selector valves controlling the flow of fuel are located at points remote from the pilot, wherefore, dependence must be placed upon other members of the crew to operate the valves in case of emergency. An additional problem in such work has been the difficulty of maintaining a satisfactory leak-proof joint at the valves.

The present invention has for its primary object, the provision of a system of fuel control wherein the operating members can be positioned within reach of the pilot and wherein the system will operate to provide selective supply from any tank or combination of tanks for dispensing fuel to any individual engine or combination of engines, thereby affording instantaneous control by the pilot independently of other members of the crew and permitting immediate disconnection of any engine or source of fuel supply in the event of an emergency.

Additionally, the invention contemplates an arrangement whereby the source of supply to any engine may be instantaneously altered without interfering with the flow of fuel to the remaining engines.

A further object of the invention is to make an apparatus which will permit any selective control desired without leakage of fuel internally or externally in the fuel system.

Another object of the invention is to provide an apparatus which will assure positive operation of the control mechanism and in which the principal parts are interchangeable for use.

In the drawings, Fig. 1 is a diagrammatic view illustrating a typical layout for selectively controlling the flow of fluid to a four-motored airplane, wherein supply tanks are utilized for containing the fuel; Fig. 2 is an assembly diagram partly in section and illustrating some of the features of the control equipment in greater detail than shown in Fig. 1; Fig. 3 is a section taken on the plane indicated by the line 3—3 in Fig. 2, and Fig. 4 is a section taken on the plane indicated by the line 4—4 in Fig. 2; Figs. 5, 6, 7, 8, and 9 are diagrammatic views illustrating different positions of the selector valve for the purpose of illustrating the flow of fuel from different tanks to one of the engines, or from one tank to another tank; Fig. 10 is a section taken on a scale larger than that shown in Fig. 2 and illustrates the sealing ring used in the control equipment; and Fig. 11 is a section showing the use of the sealing member in Fig. 10.

In Fig. 1, the sources of fuel supply are designated by tanks A, B, C, and D, respectively, while the devices which utilize the liquid contained in the tanks are indicated as engines 10, 11, 12 and 13, respectively. Each tank is connected to one of the engines, and between each tank and engine, I provide a selector with valve mechanism which may be selectively operated at a remote point for permitting the operation of each engine by fuel from its associated tank, or from any other tank. Additionally, the valve mechanism may be so operated that the fuel from any tank may be replenished by that in any other tank.

In the illustration of Fig. 1, which comprises a four-motored system, the various selector valves for the respective engine and tank units are designated in general at 20, 21, 22 and 23, respectively. These selectors are identical in construction and are shown in greater detail in Figs. 2 and 3, and each has provision for connecting the conduits that lead respectively to its associated tank and engine, and to the other selector valves. Thus, for example, selector 20 has a conduit 30 connecting it to the engine 10, a conduit 31 connecting it to the tank A, and a manifold conduit 32 connecting it to the other selectors 21, 22 and 23, respectively. The same numerals are used for designating corresponding conduits leading from the chambers 21, 22 and 23, to their respective engines and tanks.

Referring to Fig. 2, the selector valve which for example may be that designated 20, embodies a cylinder having end walls 24 and 25, and having enlarged portions 26, 27, and 28, respectively, in the region of the connection to the conduits 31, 30 and 32, respectively. A valve unit is disposed within the chamber and comprises a plurality of pistons indicated at 35, 36, 37, and 38 as being rigidly mounted upon a piston rod 39.

The rod terminates at the end pistons 35 and 36, and the pistons are so spaced upon the rod that movement thereof as a unit within the chamber will direct the flow of liquid therein in a predetermined manner, as will hereinafter be set forth.

Each selector valve for a multiple-motored plane has an auxiliary selector, preferably in the nature of a bypass conduit as a part thereof as is illustrated in Fig. 3, at 40. Such auxiliary selector is used only in multi-engined planes and then only when the engine with which it is associated is stopped or out of commission, at which time the auxiliary selector valve is preferably interlocked with the means for controlling the main selector valve, as will hereinafter be set forth in detail, in which position flow of liquid is permitted from the tank normally used for the inactive engine and is directly connected with the manifold conduit 32, whereby such liquid is then available for use by the other engines, or for transference to other tanks, as desired.

The auxiliary selector preferably embodies a cylinder, the ends of which are in direct communication with the recesses 26 and 28 of the selector 20. A piston 41 serves to control the flow of liquid through the by-pass and in the form shown in Fig. 3, the piston is in the open position and is held in such condition against the influence of a spring 42 which normally tends to move it to the closed position as shown by the broken lines 41a. The housing for the by-pass conduit may be attached to the side of the casting which forms the selector 20 in any suitable way.

The relationship of the various conduits that lead to and from the main selector, and of the valve members associated therewith, may best be illustrated in Figs. 5 to 9. Thus, for example, in Fig. 5, the fuel flows directly from the tank, such as that indicated at A, to the engine, such as that indicated at 10. Inasmuch as the by-pass conduit or auxiliary selector is disposed at the side of the main selector unit, whereas the supply conduits are positioned at the bottom, and the discharge conduit is disposed at the top thereof, it would be difficult to illustrate the path of the flow in two planes. Accordingly, Figs. 5 to 9 show the by-pass conduit at the bottom of the main selector for the purpose of diagrammatically illustrating the flow of fuel for various positions of the valve, and in each instance the curved arrows show the flow of fuel. In Fig. 5 the valve settings are such that fuel is supplied for example, to engine 10 from the tank A; in Fig. 6, engine 10 is operated by fuel received from tank A, as well as by fuel flowing through the manifold connection 32, and inasmuch as the manifold connection is in communication with each of the other main selectors, engine 10 can receive fuel from any or all of the other tanks B, C, or D, respectively.

Fig. 7 illustrates a valve setting wherein fuel is flowing from tank A into the manifold connection, to the exclusion of the engine 10, while Fig. 8 shows the off positions of engine and tank, and Fig. 9 shows the flow of fuel from the manifold conduit 32 to the engine 10. Thus, any engine may receive a supply of fuel, either from its own associated tank, or from any of the other tanks, depending upon the setting of the valves in the respective control units.

Referring now to Fig. 2, the mechanism for remotely controlling the position of the valve assembly in the selector 20 may be called a servo-motor and preferably comprises a pilot cylinder 50, in which a piston 51 is mounted for manual reciprocation. One end of the cylinder is connected by a conduit 52 to one end of the selector 20 through an opening in the wall 24, while the other end of the cylinder is connected as by conduit 53 to the opposite end of the selector 20 through an opening in the wall 25. The space then between the outer faces of pistons 35 and 36, as well as the conduits 52 and 53, and all of the available space within the cylinder 50 are filled with a non-compressible fluid, such as oil, wherefore, any reciprocation of the piston 51 effects a simultaneous movement of the piston assembly in the selector 20. The sizes of the various parts are so chosen that within the limits of movement of the piston 51, the valve assembly in the selector 20 can be moved to distribute the flow of liquid, as illustrated in the Diagrams 5 to 9, respectively.

A convenient arrangement for moving the piston 51 selectively embodies a hand lever 55 which is pivotally mounted at 56 on a bracket which may form an extension of the end wall 57 of the cylinder 50. The lever may be connected through a link 58 to the piston rod 59, while an indexing plunger 60, carried by the lever, may be urged by a spring 61 into engagement with spaced indentations on the periphery of the bracket sector 62. Such indentations may be designated as 1, 2, 0, 3, and 4, respectively, the "0" position constituting the "off" position as shown in Figs. 7 and 8, and as illustrated in Fig. 2.

When the lever 55 is in position "1," the valve assembly for selector 20 is in the position of Fig. 5. Position "2" corresponds to Fig. 6, and "0" position corresponds to Figs. 7 and 8. Position "3" corresponds to the broken line position of Fig. 6, in which case the intermediate piston 37 would be in the position shown for piston 36, while the piston 36 would be disposed opposite the entrance 80, to the by-pass conduit. Position 4 corresponds to that shown in Fig. 9.

Normally, as previously stated, the by-pass associated with each selector is held in closed position, such as is shown in broken lines 41a in Fig. 3, and diagrammatically in Figs. 5, 6, 8, and 9. When, however, it is desired to open the by-pass so as to permit the flow of fuel, either from one of the tanks into the manifold line, or vice versa, then the rod 65 on which the piston 41 is mounted is moved axially against the force of the spring 42 until the piston 41 comes to a stop by a shoulder on the piston stem and clears the wall of its cylinder, at which time fuel may flow through the by-pass conduit in either direction desired.

Whenever the by-pass conduit is open, it is desirable that the engine associated therewith be shut off, as is shown diagrammatically in Fig. 7, at which time the lever 55 will be in "0" or central position shown in Fig. 2. Accordingly, to hold the by-pass valve in open position, I have shown a holding device in the form of a pin 70 which is adapted to be inserted through registering openings 81 and 82 in the bracket arm 45 and lever 55, respectively. The pin 70 may have a threaded passageway extending therethrough for receiving a threaded rod 71 which in turn is connected to the piston rod 65 by a flexible cord or wire 72. Such arrangement not only holds the by-pass valve in open position, but also locks the engine control valve in off position, the handle of which cannot be moved until the pin 70 has been pulled out.

In the normal operation, each tank will supply fuel to its own engine without the necessity for utilizing fuel from the interconnecting manifold 32. However, in the event that any particular engine is disabled, or in the event that any particular tank is put out of commission, the pilot is able immediately to shut off such engine or tank by placing the pilot valve lever at "0." Such master pilot valve is placed within easy reach of the pilot, and the pilot control valves are grouped together adjacent the pilot and by tubing are connected with the selector valve at any remote position in the plane. The controls permit the fuel from any tank to be utilized for operating any one engine and also permit the fuel from one or more tanks to be distributed to any other tank so as to maintain equilibrium of weight disbursal in the plane.

To prevent the escape of liquid past any of the pistons used herein and at the same time to permit movement of the pistons beyond the sealing portion of the cylinder, and permit withdrawal into such portion without damaging the sealing material, I prefer to utilize a resilient ring 75 of circular cross-section, as shown in Fig. 10, mounted in piston grooves 76, or within corresponding grooves in the end walls of the respective cylinders. The depth of each groove is such that when the parts are assembled, the ring is forced to assume an ellipsoidal shape, as shown in Fig. 11, but the width of the groove is greater than the longest cross-sectional dimension of the deformed ring so as to permit slight movement of the ring back and forth in the groove whenever the piston is moved. Such action tends to knead the material of which the ring is made and thereby to keep it alive. Moreover, since each piston is narrower than the width of the recess in the cylinder, each piston may move back and forth without affecting the ability of the ring to maintain a good seal.

While I have illustrated the system as applied to a multi-motored plane, nevertheless, the selector unit is applicable for use in a single-motored plane where a plurality of tanks are used as the source of supply, in which case the opening which normally communicates with the manifold conduit 32 would communicate with the auxiliary tank or with another tank that is used as a source of supply. In such installations, the by-pass conduit and its associated valve mechanism may be eliminated, such as by closing off the openings leading thereto by means of a plate. The main selector valve, therefore, operates to permit fuel to be supplied to the engines from one or both tanks, as desired, and the operation for selecting the positions are the same as are illustrated in Figs. 5, 6, 8 and 9.

An important advantage of the present invention is the fact that the pilot can, independently of other members of his crew and without leaving his station, quickly select any tank or engine, or combination of tanks or engines, as an emergency situation or operating condition may require. Such selective means may be located conveniently to the position of the operator irrespective of the remoteness of the tanks or engine from such position and irrespective of the remoteness of the selector valves from such position. Thus, the selector valves may be disposed in a direct line between each tank and its associated engine and, hence, multiplicity of conduits in a restricted space is avoided.

Reference is made to my divisional application, filed February 20, 1948, Serial No. 9,889 for claims relating to the valve mechanism herein illustrated, and also to my application Ser. No. 554,949, filed September 20, 1944, for a Fluid control apparatus, which is a continuation in part of this application, Ser. No. 494,749.

I claim:

1. A liquid distribution system comprising a plurality of liquid storage containers, a plurality of consuming devices, a plurality of selector devices each including a valve means therein, a plurality of supply lines for respectively establishing communication between the containers and the selector devices, a plurality of delivery lines for establishing communication between the selector devices and the respective consuming devices, an interconnecting line for establishing communication between the selector devices, said valve means being adjustable to a plurality of positions and so constructed and arranged that in one position communication between its associated supply, delivery and interconnecting line is precluded, in a second position, communication between the supply and delivery lines is established, while communication with the interconnecting line is precluded, in a third position flow between the associated supply, delivery and interconnecting lines is established, in a fourth position communication between the associated delivery and interconnecting line is established, while communication with the supply line is precluded, and in a fifth position communication between the associated supply and intercommunicating line is established, while communication with the delivery line is precluded.

2. A liquid distribution system comprising a plurality of liquid storage containers, a plurality of consuming devices, a plurality of selector units each including a valve means therein, a plurality of supply lines for respectively establishing communication between the containers and the selector units, a plurality of delivery lines for respectively establishing communication between the selector units and the consuming devices, an interconnecting line for establishing communication between the selector units, said valve means being adjustable to a plurality of positions and so constructed and arranged that communication may be precluded between the interconnecting line and the associated supply line and its associated delivery line, or that communication may be established in the associated one or all of the following ways: between a supply line and its associated delivery line to the exclusion of the interconnecting line, between the interconnecting line and the associated delivery line to the exclusion of the associated supply line, between the interconnecting line and the associated supply line to the exclusion of the associated delivery line, between the interconnecting line and the associated supply and associated delivery line.

3. A liquid distribution system comprising, a plurality of liquid storage means, a liquid consuming device, a casing, supply conduits establishing communication between the interior of the casing and respective storage means, a delivery conduit establishing communication between the casing and the consuming device, a multi-piston main valve in said casing and an auxiliary valve associated therewith each adapted to occupy different positions respectively, said main valve acting in one position to establish the flow of liquid from all storage means to said consuming device and in another position coupling one supply conduit with said delivery conduit to permit the flow of liquid from one of said storage means to said device and disconnecting the other storage means from said delivery conduit to exclude the flow from all other storage means to said device, said auxiliary valve acting in relation to said first two positions of the main valve to preclude the flow of liquid between the respective storage means, said main valve in another position acting to preclude the flow of liquid from all of said storage means to said device, said auxiliary valve acting in relation to said last position of the main valve to by-pass the consuming device and to couple all said storage means together directing the flow of liquid between said storage means, and means acting on the ends of said multi-piston valve and said auxiliary valve for moving them axially in relation to the casing.

4. A liquid distribution system comprising two liquid storage means, a liquid consuming device, a casing, two supply conduits establishing communication between the casing and the respective storage means, a delivery conduit establishing communication between the casing and the consuming device, valve means in said casing, said valve means being adjustable to various positions and so constructed and arranged that in one position it will establish communication between one supply conduit and the delivery conduit and disconnect the other supply conduit from the delivery conduit, and in another position establish communication exclusively between last-named supply conduit and the delivery conduit and disconnect the other supply conduit from the delivery conduit, and in still another position establish communication between both supply conduits and said delivery conduit, and in another position close all conduits from communication with each other, and other valve means associated with said supply conduits and casing constructed and arranged to establish inter-communication between both supply conduits, when said first-mentioned valve means is in said last-named position.

5. A liquid distribution system comprising, a plurality of liquid storage means, a plurality of casings, supply conduits establishing communication between the respective storage means and the respective casings, a plurality of consuming devices, a delivery conduit connecting each casing with a respective consuming device, another conduit interconnecting said casings, a plurality of multi-piston valves one in each casing adapted to control the flow of liquid in said system, said valves acting in one position to establish the flow of liquid from a given storage means to the corresponding consuming device, and in another position acting to establish the flow of liquid from other storage means communicating with a given consuming device through the corresponding casing, and in a third position acting to preclude the flow of liquid from all storage means to the particular consuming device, a plurality of servo-motors, one associated with each of the respective valves for operating the same, each servo-motor having a manually operable member for actuating it, a plurality of selectors one associated with each casing and each having a pair of passageways communicating with the corresponding casing, one of which passageways may communicate through the casing with the corresponding supply conduit for that casing and the other of which may communicate through the casing with the conduit interconnecting said casings, each selector having valve means for controlling communication between said pair of passageways, and operating means connecting each selector valve means with the operating means for its corresponding servo-motor whereby each valve and its associated selector are controlled by a common operating member.

6. A liquid distributing system comprising two liquid storage containers, two liquid consuming devices, two controlling valves, a delivery conduit between each controlling valve and a corresponding liquid consuming device, two supply conduits connecting the respective containers with the corresponding valves, another conduit connecting the valves together, said valves being each adjustable to various positions and so constructed and arranged that in one position either valve will establish communication between its associated supply conduit and its associated delivery conduit to the exclusion of communication with the connecting conduit, in another position will establish communication between said connecting conduit and its associated delivery conduit to the exclusion of communication with the associated supply conduit, and in a third position will preclude communication between all the storage means and said delivery conduit, and two auxiliary valves each auxiliary valve being associated with a respective control valve and each having passageways communicating with that portion of the associated valve which communicates with the respective supply conduit and that portion of the associated valve which communicates with the connecting conduit and adapted to form a by-pass between the two said portions of its respective control valve, and wherein each auxiliary valve includes means to control the flow of liquid between its respective passageways.

NIELS A. CHRISTENSEN.

REFERENCES CITED

The following references are of record in the file of this patent:

UNITED STATES PATENTS

| Number | Name | Date |
|---|---|---|
| 312,158 | Penney | Feb. 10, 1885 |
| 1,063,975 | King | June 10, 1913 |
| 1,329,997 | Page | Feb. 3, 1920 |
| 1,633,483 | Graham | June 21, 1927 |
| 1,726,721 | Schullstrom | Sept. 3, 1929 |
| 1,765,090 | Morin | June 17, 1930 |
| 2,055,347 | Hackman | Sept. 22, 1936 |
| 2,084,368 | Wynn | June 22, 1937 |
| 2,146,729 | Gavin | Feb. 14, 1939 |
| 2,268,957 | Muselier | June 6, 1942 |